(12) United States Patent
Uchidani

(10) Patent No.: US 11,934,042 B2
(45) Date of Patent: Mar. 19, 2024

(54) CURVED FACE SHAPE EVALUATION METHOD, EYEGLASS LENS MANUFACTURING METHOD, AND EYEGLASS LENS

(71) Applicant: HOYA LENS THAILAND LTD., Pathumthani (TH)

(72) Inventor: Takahiro Uchidani, Tokyo (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 373 days.

(21) Appl. No.: 17/279,755

(22) PCT Filed: Sep. 24, 2019

(86) PCT No.: PCT/JP2019/037306
§ 371 (c)(1),
(2) Date: Mar. 25, 2021

(87) PCT Pub. No.: WO2020/067028
PCT Pub. Date: Apr. 2, 2020

(65) Prior Publication Data
US 2022/0035177 A1    Feb. 3, 2022

(30) Foreign Application Priority Data

Sep. 28, 2018    (JP) .................. 2018-184811

(51) Int. Cl.
*G02C 7/02*    (2006.01)
*G01B 11/24*    (2006.01)
*G01M 11/02*    (2006.01)

(52) U.S. Cl.
CPC .............. *G02C 7/024* (2013.01); *G01B 11/24* (2013.01); *G01M 11/025* (2013.01)

(58) Field of Classification Search
CPC .... G02C 7/024; G02C 2202/24; G02C 7/022; G01B 11/24; G01M 11/025
See application file for complete search history.

(56) References Cited

U.S. PATENT DOCUMENTS 9,759,930 B2 *    9/2017   Bakaraju ............... A61F 2/1616
2009/0002574 A1 *    1/2009   Sorek ..................... H04N 23/81
348/784

(Continued)

FOREIGN PATENT DOCUMENTS

CN    101303269 A    * 11/2008    ........ G01M 11/0228
DE    102015108839 A1    12/2016

(Continued)

OTHER PUBLICATIONS

Kakimoto, Masanori, Tomoaki Tatsukawa, and Tomoyuki Nishita. "An eyeglass simulator using conoid tracing." In Computer Graphics Forum, vol. 29, No. 8, pp. 2427-2437. Oxford, UK: Blackwell Publishing Ltd, 2010. (Year: 2010).*

(Continued)

*Primary Examiner* — Eunhee Kim
(74) *Attorney, Agent, or Firm* — Kilpatrick Townsend & Stockton LLP

(57) ABSTRACT

With regard to an eyeglass lens that is provided with a plurality of defocus regions on at least one of an object-side surface and an eyeball-side surface, the surface shape is evaluated through measuring the surface shape of the surface of the eyeglass lens that has the plurality of defocus regions, and acquiring three-dimensional data regarding the surface shape; a classifying data groups regarding the plurality of respective defocus regions and a data group regarding a base region, which is a region where the defocus regions are not formed, by performing cluster analysis on the three-dimensional data; combining curved surface shape data obtained by performing curve fitting on each of the (Continued)

classified data groups, and extracting reference shape data regarding the object-side surface; and comparing the three-dimensional data and the reference shape data, and obtaining degrees of deviation of the three-dimensional data from the reference shape data.

11 Claims, 8 Drawing Sheets

(56) References Cited

U.S. PATENT DOCUMENTS

| | | | |
|---|---|---|---|
| 2013/0182215 A1 | 7/2013 | Tung | |
| 2016/0062144 A1 | 3/2016 | Brennan et al. | |
| 2017/0131567 A1* | 5/2017 | To | G02C 7/06 |
| 2020/0326559 A1 | 10/2020 | Hoshi | |

FOREIGN PATENT DOCUMENTS

| | | | |
|---|---|---|---|
| EP | 2799832 | A2 | 11/2014 |
| JP | 2015503769 | A | 2/2015 |
| JP | 2016051180 | A | 4/2016 |
| WO | 9534800 | A1 | 12/1995 |
| WO | 2016071078 | A2 | 5/2016 |
| WO | 2018143813 | A1 | 8/2018 |
| WO | 2019124352 | A1 | 6/2019 |

OTHER PUBLICATIONS

EP19867916.9, "Extended European Search Report", dated May 20, 2022, 10 pages.

Kong et al., "Characterization of surface generation of optical microstructures using a pattern and feature parametric analysis method", Precision Engineering, vol. 34, 2010, 755-766.

Manaf et al., "Improvement of form accuracy and surface integrity of Si-HDPE hybrid micro-lens arrays in press molding", Precision Engineering, vol. 47, 2017, 469-479.

Senin et al., "Three-dimensional surface topography segmentation through clustering", Science Direct Wear, vol. 62, 2007, 395-410.

PCT/JP2019/037306, "International Preliminary Report on Patentability", dated Apr. 8, 2021, 8 pages.

PCT/JP2019/037306, English Translation of International Search Report, dated Dec. 17, 2019, 2 pages.

* cited by examiner

CURVED FACE SHAPE EVALUATION METHOD, EYEGLASS LENS MANUFACTURING METHOD, AND EYEGLASS LENS

CROSS-REFERENCE TO RELATED APPLICATIONS

This application is a National Stage of International Application No. PCT/JP2019/037306, filed Sep. 24, 2019, which claims priority to Japanese Patent Application No. 2018-184811, filed Sep. 28, 2018, and the contents of which are incorporated by reference.

TECHNICAL FIELD

The present disclosure relates to a curved surface shape evaluation method, a method for manufacturing an eyeglass lens, and an eyeglass lens.

BACKGROUND ART

Examples of eyeglass lenses for suppressing the progression of a refractive error such as near-sightedness include eyeglass lenses whose convex surfaces, which are object-side surfaces, have curved surfaces that are different from the convex surfaces and are provided with a plurality of convex regions that protrude from the convex surfaces (e.g., see Patent Document 1). According to an eyeglass lens having this configuration, in principle, luminous flux that enters from the object-side surface and is emitted from an eyeball-side surface is focused on the wearer's retina, whereas luminous flux that has passed through a portion of a convex region is focused at a position that is closer to the object than a position on the retina is, and thus the progression of near-sightedness is suppressed.

CITATION LIST

Patent Documents

Patent Document 1: US 2017/013567A

SUMMARY OF DISCLOSURE

Technical Problem

With regard to the above-described eyeglass lens, if the object-side surface is coated with a hard coating film or the like, there are cases where there is so-called sagging in a boundary portion between the convex region and a region other than the convex region, and thus the boundary portion becomes unclear. If the boundary portion is unclear, the surface shape of the convex region cannot be correctly evaluated, and as a result, there is a risk that the magnitude of sagging cannot be controlled appropriately.

The present disclosure aims to provide a technique with which it is possible to make an eyeglass lens sufficiently exhibit the effect of suppressing the progression of near-sightedness or far-sightedness (which will be collectively referred to as a refractive error in this specification, hereinafter), through appropriate evaluation of a surface shape thereof.

Solution to Problem

The present disclosure was made to achieve the above-described aim.

A first aspect of the present disclosure is a curved surface shape evaluation method including:
a step of, with regard to an eyeglass lens that is provided with an object-side surface and an eyeball-side surface, and that has a plurality of defocus regions on at least one of the object-side surface and the eyeball-side surface, acquiring three-dimensional data regarding a surface shape of the surface of the eyeglass lens that has the plurality of defocus regions by measuring the surface shape of the surface of the eyeglass lens that has the plurality of defocus regions;
a step of classifying data groups regarding the plurality of respective defocus regions and a data group regarding a base region, which is a region where the defocus regions are not formed, by performing cluster analysis on the three-dimensional data;
a step of combining curved surface shape data obtained by performing curve fitting on each of the classified data groups, and extracting reference shape data regarding the object-side surface of the eyeglass lens; and
a step of comparing the three-dimensional data and the reference shape data, and obtaining degrees of deviation of the three-dimensional data from the reference shape data.

A second aspect of the present disclosure is the curved surface shape evaluation method according to the first aspect,
in which the data groups regarding the defocus regions and the data group regarding the base region are classified based on a threshold derived from the three-dimensional data.

A third aspect of the present disclosure is the curved surface shape evaluation method according to the second aspect,
in which the threshold is determined by approximating the three-dimensional data using the method of least squares, and utilizing a bearing curve regarding a result of the approximation.

A fourth aspect of the present disclosure is the curved surface shape evaluation method according to any one of the first to third aspects,
in which the data groups regarding the plurality of respective defocus regions are classified using k-means.

A fifth aspect of the present disclosure is the curved surface shape evaluation method according to any one of the first to fourth aspects,
in which, in the step of classifying the three-dimensional data into data groups, the three-dimensional data is classified into a data group regarding the defocus regions, a data group regarding the base region, and a data group regarding a boundary-vicinity region, which is a transition region between the defocus regions and the base region.

A sixth aspect of the present disclosure is a method for manufacturing an eyeglass lens, the method including the curved surface shape evaluation method according to any one of the first to fifth aspects.

A seventh aspect of the present disclosure is the method for manufacturing an eyeglass lens according to the sixth aspect,
in which the eyeglass lens is manufactured by reflecting a result of obtaining the degrees of deviation.

An eighth aspect of the present disclosure is an eyeglass lens that is provided with an object-side surface and an eyeball-side surface, and that has a plurality of defocus regions on at least one of the object-side surface and the eyeball-side surface, in which reference shape data regarding the surface that has the plurality of defocus regions is specified based on three-dimensional data obtained by measuring a surface shape of the surface that has the plurality of defocus regions, degrees of deviation of the three-dimensional data from the reference shape data are specified, and out of the degrees of deviation, the magnitude of the degree of deviation regarding a boundary-vicinity region, which is a transition region between the defocus regions and a base region, which is a region where the defocus regions are not formed, is 15% or less of a protrusion height or a recess depth of the defocus regions.

A ninth aspect of the present disclosure is the eyeglass lens according to the eighth aspect, in which the magnitude of the degree of deviation is 0.1 μm or less.

Another aspect of the present disclosure is as follows.

The object-side surface has a defocus region, and the defocus region protrudes toward the object side.

The eyeball-side surface has a defocus region, and the defocus region protrudes toward the eyeball side.

These two aspects may be combined, and both surfaces may have defocus regions.

Another aspect of the present disclosure is as follows.

By changing "convex" to "concave", "protrusion" to "recess", and the "protrusion height" to the "recess depth" in an eyeglass lens, and changing a description such that rays converge at a position B' that is located farther away from the object than a position A on the retina is, the function of suppressing the progression of farsightedness can be achieved.

Advantageous Effects of Disclosure

According to the present disclosure, it is possible to make an eyeglass lens sufficiently exhibit the effect of suppressing the progression of a refractive error, through appropriate evaluation of a surface shape thereof.

DESCRIPTION OF EMBODIMENTS

The following describes embodiments of the present disclosure based on the drawings.

(1) Configuration of Eyeglass Lens

First, a configuration of an eyeglass lens given as an example in this embodiment will be described.

Figure 1:
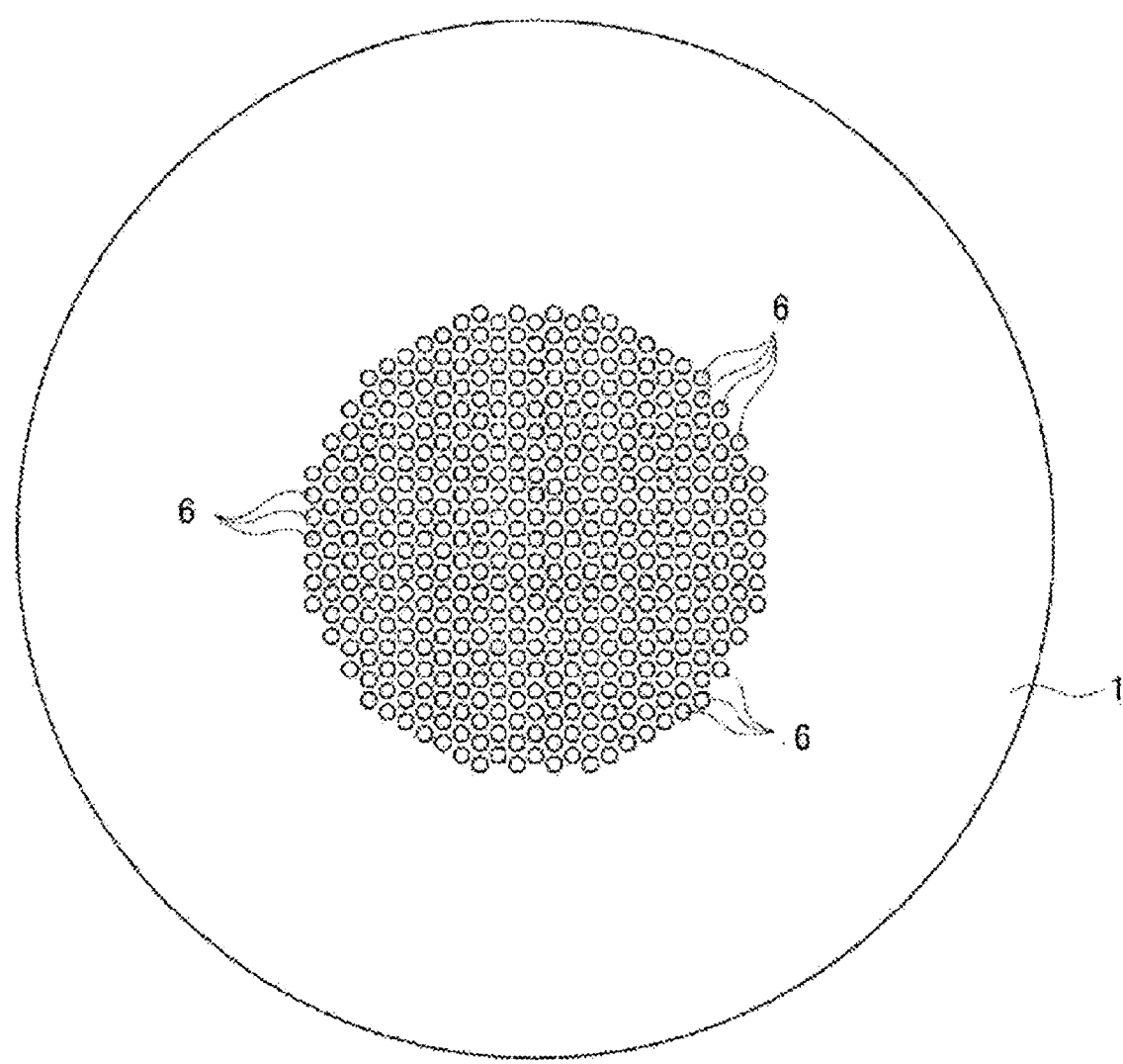
FIG. 1 is a front view showing a shape of an eyeglass lens to be evaluated according to one aspect of the present disclosure.
Figure 2:
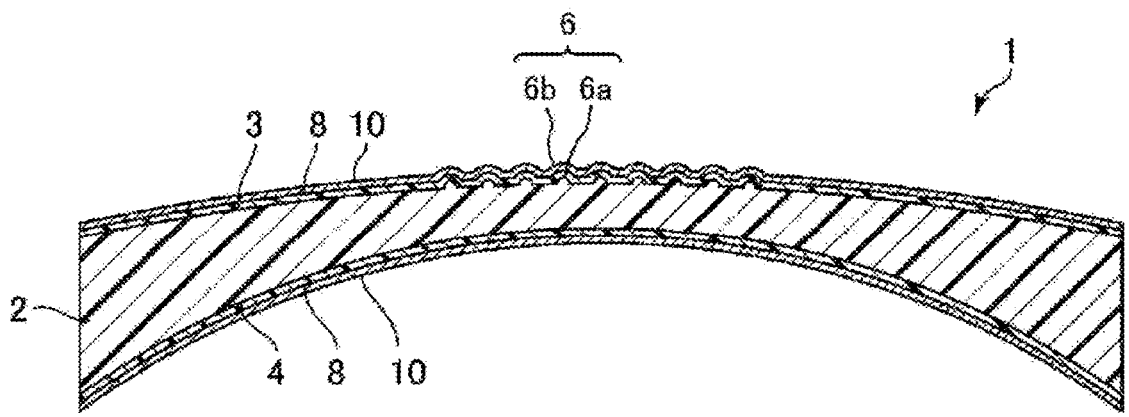
FIG. 2 is a cross-sectional view showing a configuration example of the eyeglass lens shown in FIG. 1.
Figure 3:
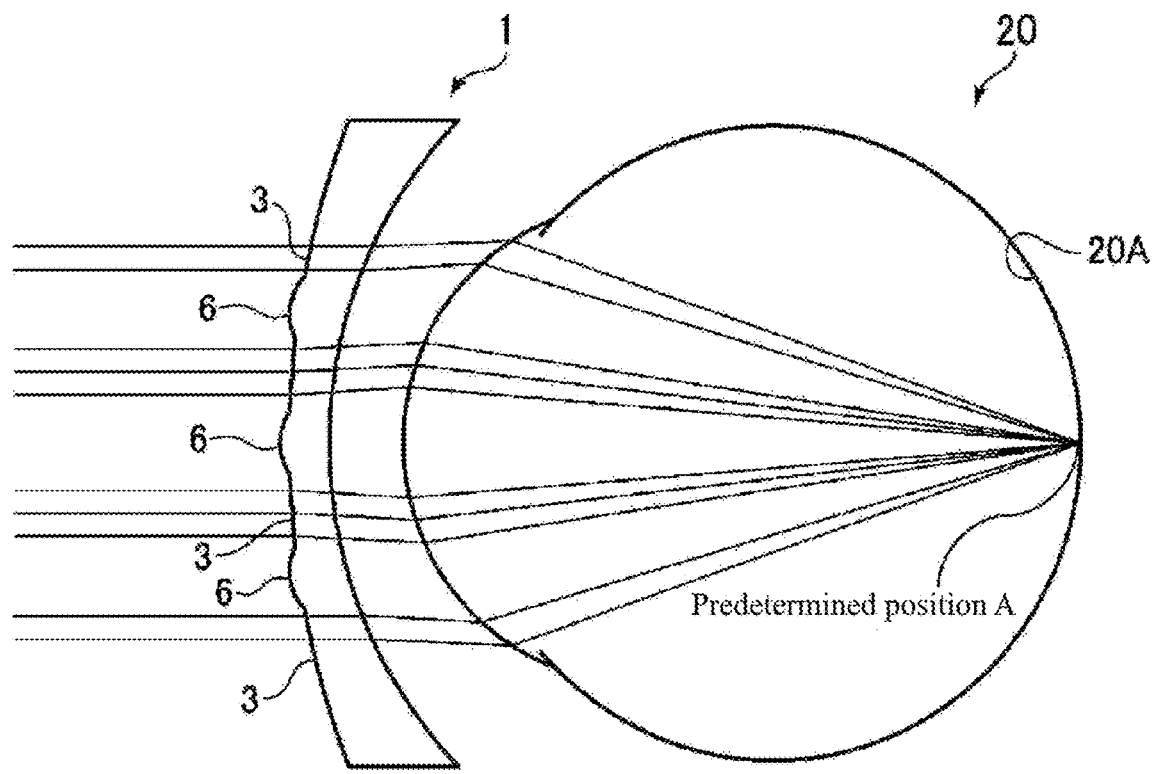
FIG. 3 is a schematic cross-sectional view (No. 1) showing a path of light passing through the eyeglass lens shown in FIG. 1.
Figure 4:
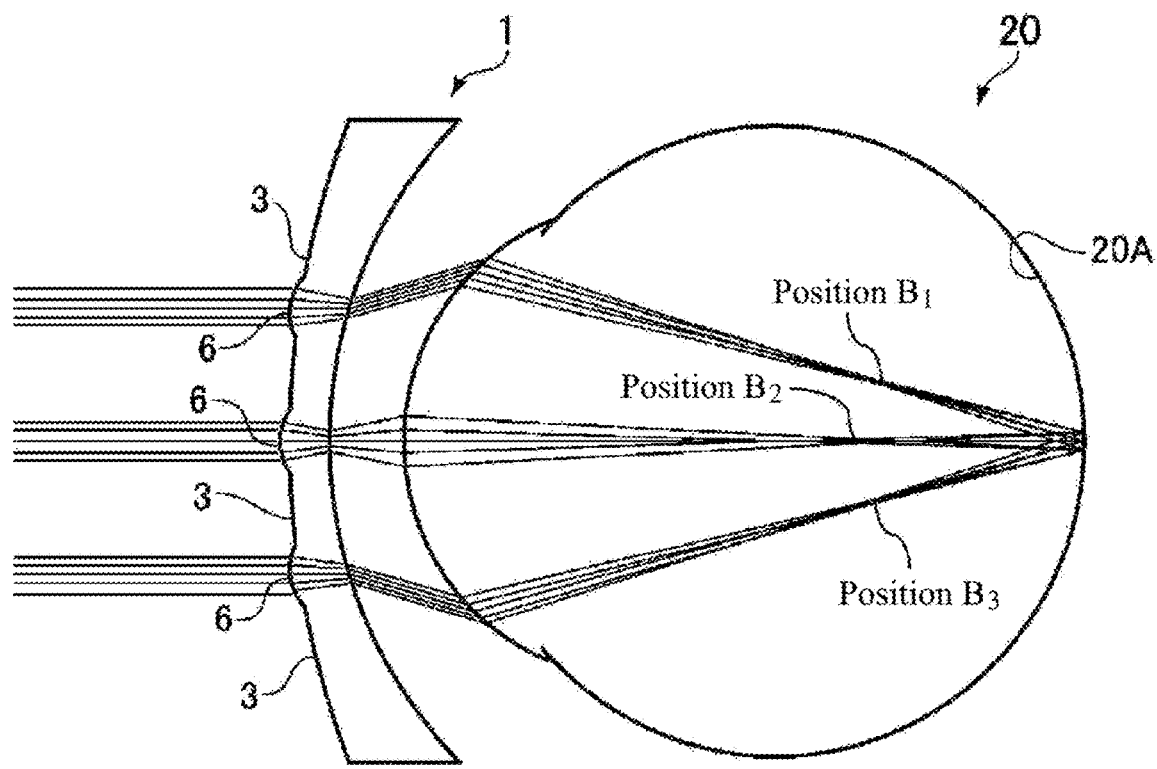
FIG. 4 is a schematic cross-sectional view (No. 2) showing a path of light passing through the eyeglass lens shown in FIG. 1.

FIG. 1 is a front view showing a shape of an eyeglass lens to be evaluated in this embodiment. FIG. 2 is a cross-sectional view showing a configuration example of the eyeglass lens shown in FIG. 1. FIGS. 3 and 4 are schematic cross-sectional views showing a path of light passing through the eyeglass lens shown in FIG. 1.

(Overall Configuration)

As shown in FIG. 1, an eyeglass lens 1 has a plurality of defocus regions 6 that are arranged regularly in the vicinity of the lens center.

The "defocus regions 6" in this embodiment refer to independent regions that are in the form of islands formed over 360 degrees on the outermost surface of the eyeglass lens 1, and that have the function of causing luminous flux to converge at a convergence position B. That is, the defocus regions 6 function to apply defocus in a positive or negative direction to the luminous flux that passes therethrough, and to cause light that passes through the defocus regions 6 to converge at a position that is different from a position at which light passing through a base portion converges.

In this embodiment, a case will mainly be described in which the defocus regions 6 are convex regions, and the eyeglass lens 1 is a near-sightedness progression suppression lens. In (5) Variations and the like, which will be described later, a case will be described in which the defocus regions 6 are recessed regions and the eyeglass lens 1 is a far-sightedness progression suppression lens.

Also, as shown in FIG. 2, the eyeglass lens 1 has an object-side surface 3 and an eyeball-side surface 4. The "object-side surface" is the surface that is located on the object side when a wearer wears the glasses including the eyeglass lens 1. The "eyeball-side surface" is the surface that is located on the opposite side, that is, the eyeball side, when the wearer wears the glasses including the eyeglass lens 1. In this embodiment, the object-side surface 3 is a convex surface, and the eyeball-side surface 4 is a concave surface. That is, the eyeglass lens 1 is a meniscus lens.

Also, the eyeglass lens 1 is constituted by a lens base material 2, hard coating films 8 that are respectively formed on the convex surface side and the concave surface side of the lens base material 2, and antireflection films (AR film) 10 that are respectively formed on the surfaces of the hard coating films 8. Note that the eyeglass lens 1 may be provided with another film, in addition to the hard coating films 8 and the antireflection films 10.

(Lens Base Material)

The lens base material 2 is made of a thermosetting resin material such as a thiourethane resin, an allyl resin, an acrylic resin, or an epithio resin material, for example. Note that another resin material having a desired refractivity may be selected as the resin material constituting the lens base material 2. Also, the lens base material 2 may be a lens base material made of inorganic glass, instead of a resin material.

The object-side surface (convex surface) of the lens base material 2 is provided with a plurality of convex regions 6a such that the convex regions 6a protrude from the object-side surface toward the object side. Each convex region 6a is constituted by a curved surface having a curvature different from that of the object-side surface of the lens base material 2. Because such convex regions 6a are formed, the convex regions 6a having a substantially circular shape are arranged on the object-side surface of the lens base material 2 in the form of islands (i.e., in a state in which the convex regions 6a are spaced apart from each other without being in contact with each other) at equal intervals in the circumferential direction and the axial direction around the lens center in a plan view.

(Hard Coating Film)

The hard coating film 8 is formed using a thermoplastic resin or a UV-curable resin, for example. The hard coating film 8 can be formed using a method of immersing the lens base material 2 in a hard coating liquid, through spin coating, or the like. An improvement in durability of the eyeglass lens 1 is achieved through this coating with the hard coating film 8.

(Antireflection Film)

The antireflection film 10 is formed by forming a film of an antireflection agent such as $ZrO_2$, $MgF_2$, or $Al_2O_3$ through vacuum deposition, for example. An improvement in the visibility of an image passing through the eyeglass lens 1 is achieved through the coating with the antireflection film 10.

(Shape of Object-Side Surface)

As described above, a plurality of convex regions 6a are formed on the object-side surface of the lens base material 2. Thus, when the surface thereof is coated with the hard coating film 8 and the antireflection film 10, a plurality of convex regions 6b are formed in conformity with the convex regions 6a on the lens base material 2 by the hard coating film 8 and the antireflection film 10 as well. In other words, the defocus regions 6 constituted by the convex regions 6a and the convex regions 6b are arranged on the object-side surface 3 (convex surface) of the eyeglass lens 1 so as to protrude from the surface 3 toward the object side.

The defocus regions 6 in this embodiment conform to the convex regions 6a of the lens base material 2, and therefore, similarly to the convex regions 6a, the defocus regions 6 are convex and are disposed in the form of islands in a state of being arranged at an equal interval in the axial direction and in the circumferential direction around the lens center, that is, being arranged regularly in the vicinity of the lens center.

The defocus regions 6 are each constituted as follows, for example. It is suitable that the diameter of the defocus region 6 is about 0.8 to 2.0 mm. It is suitable that the protrusion height (protrusion amount) of the defocus region 6 is about 0.1 to 10 µm, and preferably about 0.7 to 0.9 µm. The protrusion height (protrusion amount) indicates the maximum distance in the nominal direction from the base region, which is a region where the defocus regions are not formed. It is suitable that the defocus region 6 has a spherical shape with a radius of curvature of about 50 to 250 mmR, or more preferably about 86 mmR. By using this kind of configuration, the refractive power of the defocus region 6 is set to be about 2.00 to 5.00 diopters greater than the refractive power of the region in which the defocus regions 6 are not formed.

(Optical Properties)

With the eyeglass lens 1 having the above-described configuration, the following optical properties can be realized due to the object-side surface 3 having the defocus regions 6, and as a result, it is possible to suppress the progression of a refractive error such as near-sightedness of the wearer of the glasses.

As shown in FIG. 3, the light that has entered the object-side surface 3 of the eyeglass lens 1 in a region (referred to a "base region" hereinafter) where the defocus regions 6 are not formed is emitted from the eyeball-side surface 4 and is focused on a retina 20A of an eyeball 20. That is, in principle, the luminous flux passing through the eyeglass lens 1 is focused on the retina 20A of the wearer of the glasses. In other words, the curvature of the base region of the eyeglass lens 1 is set according to a prescription for the wearer of the glasses, such that a focal point is formed on the retina 20A, which is the position A on the retina, via an eye.

On the other hand, as shown in FIG. 4, the light that has entered the defocus regions 6 of the eyeglass lens 1 is emitted from the eyeball-side surface 4 and is focused at a position on the object side relative to the retina 20A of the eyeball 20. That is, the defocus regions 6 cause light emitted from the eyeball-side surface 4 to converge at positions B on the object side relative to the position A on the retina in a direction in which light travels. The convergence positions B are present as positions $B_1, B_2, B_3, \ldots B_N$ according to the plurality of defocus regions 6.

In this manner, in principle, the eyeglass lens 1 causes the luminous flux that has entered from the object-side surface 3 to be emitted from the eyeball-side surface 4 and to converge at the position A on the retina via the eye. On the other hand, at the portions at which the defocus regions 6 are arranged, the eyeglass lens 1 causes the luminous flux to converge at the positions B ($B_1, B_2, B_3, \ldots B_N$) on the object side relative to the position A on the retina in the direction in which light travels. That is, the eyeglass lens 1 has the function of causing the luminous flux to converge at the positions B on the object side relative thereto, which is different from the luminous flux converging function for realizing the prescription of the wearer of the glasses. The eyeglass lens 1 can exhibit the effect of suppressing the progression of near-sightedness of the wearer of the glasses due to having such optical properties.

(2) Procedure for Evaluating Surface Shape

Next, a procedure for evaluating the surface shape of the eyeglass lens 1 having the above-described configuration, that is, one example of the procedure of a method for evaluating a curved surface shape according this embodiment will be described in detail.

(Necessity of Evaluation)

In order to make the eyeglass lens 1 having the above-described configuration sufficiently exhibit the effect of suppressing the progression of near-sightedness, it is necessary to evaluate whether or not the surface shapes of the object-side surface 3 and the eyeball-side surface 4, in particular, the surface shape of the object-side surface 3 that has the defocus regions 6, are formed as desired. However, as will be described below, it is not always easy to appropriately evaluate the surface shape of the object-side surface 3 having the defocus regions 6.

The object-side surface 3 of the eyeglass lens 1 having the above-described configuration is coated with the hard coating film 8 and the antireflection film 10. Thus, with regard to the object-side surface 3, there is so-called sagging in boundary portions between the defocus regions 6 and the base region, which is a region excluding the defocus regions 6, and thus there are cases where boundary portions become unclear. If the boundary portions are unclear, the surface shape of the defocus regions 6 cannot be correctly evaluated, and as a result, there is a risk that the magnitude of sagging cannot be controlled appropriately.

Also, usually, the surface shape is evaluated by comparing actually measured data and design data regarding the surface shapes. However, if the object-side surface 3 is coated, data regarding the design of the surface shape of the coated surface needs to be prepared, instead of data regarding the design of the lens base material 2, and thus such data cannot always be easily or appropriately prepared. Even if design data regarding the coated surface is prepared, collation processing between a data portion regarding the defocus regions 6 in the actually measured data and a data portion regarding the defocus regions 6 in the design data is very complicated and problematic, and as a result, there is a risk that the surface shape of the defocus regions 6 cannot be correctly evaluated.

As a result of intensive studies in view of the above-described respects, the inventor of this disclosure devised an evaluation procedure by which the surface shape of the object-side surface 3 having the defocus regions 6 can be correctly evaluated without preparing design data in advance, regardless of whether or not the object-side surface 3 is coated. The following describes the evaluation procedure (i.e., a procedure of an evaluation method according to this embodiment).

(Overview of Evaluation Procedure)

Figure 5:
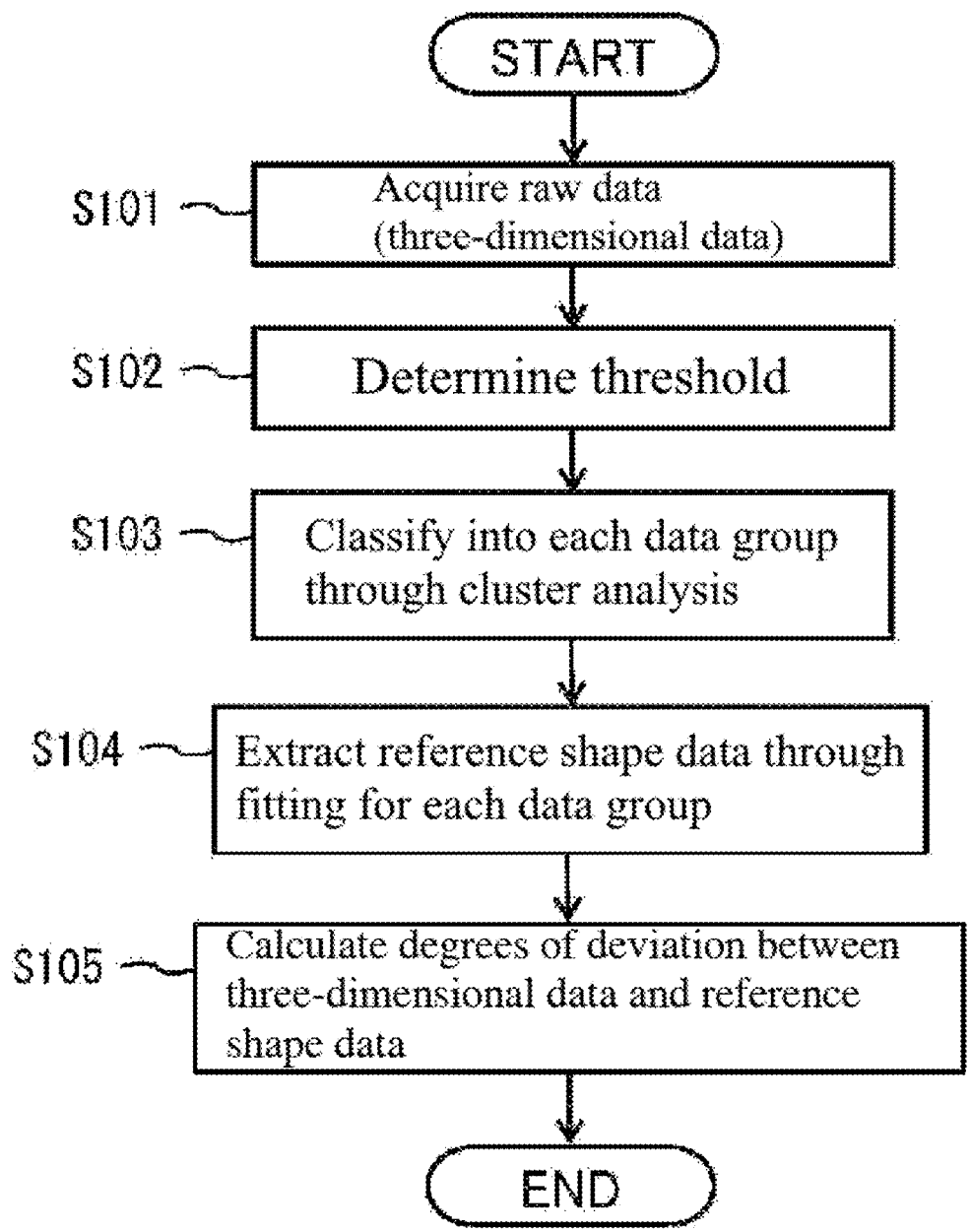
FIG. 5 is a flowchart showing an overview of a procedure of an evaluation method according to one embodiment of the present disclosure.

FIG. 5 is a flowchart showing an overview of a procedure of an evaluation method according to this embodiment.

As shown in FIG. 5, when the surface shape of the object-side surface 3 of the eyeglass lens 1 is evaluated, first, three-dimensional data regarding the surface shape of the object-side surface 3 of the eyeglass lens 1 to be evaluated is acquired by measuring the surface shape of the object-side surface 3 as a first step (step 101, and step will be abbreviated as "S" hereinafter). The three-dimensional data need only be acquired using a known three-dimensional measuring device. Accordingly, with regard to the surface shape of the object-side surface 3, XYZ-coordinate value data obtained by measuring the Z-coordinates at equal pitches on the XY coordinates is obtained as raw data (three-dimensional data).

When three-dimensional data is acquired, subsequently, a threshold that is required for classification of data into data groups, which will be described later, is determined as a second step (S102). The threshold is determined through derivation from the acquired three-dimensional data.

Specifically, with regard to the XYZ coordinate value data constituting the acquired three-dimensional data, so-called shape removal is performed through spherical approximation of the overall data using the method of least squares, for example. Then, with regard to the results of the approximation (i.e., data obtained after shape removal has been performed), a certain height threshold is determined with which data regarding portions of the defocus regions 6 (referred to as "segment data" hereinafter) and data regarding a portion of the base surface region (referred to as "base surface data" hereinafter) are classified utilizing a method for calculating a load curve (also referred to as a "bearing curve" hereinafter) of a roughness curve that is normally used to evaluate roughness.

More specifically, when the height threshold is determined, the minimum value and the maximum value of the height data of the shape subjected to shape removal are applied to the vertical axis of a load curve graph, and the interval therebetween is finely divided and scaled at certain pitches. Then, a ratio of height data points at higher positions of the shapes subjected to shape removal to data points at height positions indicated by the scales is obtained, the ratio is plotted on the horizontal axis of the load curve graph, and the plot points are connected to obtain a load curve (bearing curve). In this manner, in a graph with the height applied to the vertical axis and the ratio applied to the horizontal axis, points located between 50% and 60% on the horizontal axis of the load curve (bearing curve) and points located between 70% and 80% are connected with a straight line, and the value of the height scale where the straight line and the vertical axis intersect each other is determined as a height threshold (i.e., a threshold derived from three-dimensional data).

Note that, in addition to the calculation method utilizing the above-described bearing curve, the threshold can be determined using a method in which an intermediate height between the minimum value and the maximum value of height data regarding the shapes subjected to shape removal, for example, and a position about 20% to 40% above the minimum distance between the minimum value and the maximum value is determined as a height threshold based on empirical data, for example.

After the threshold has been determined, then, as a third step, cluster analysis is performed on the acquired three-dimensional data using the threshold, and the three-dimensional data is classified into data groups (S103). The data groups into which data is to be classified include at least a data group regarding the defocus regions 6 and a data group regarding the base region, and preferably also include a data group regarding a boundary-vicinity region, which will be described later in detail. Note that a specific procedure for classification of data into data groups utilizing cluster analysis will be described later in detail.

After the three-dimensional data has been classified into the data groups, then, as a fourth step, curve fitting is performed on each of the classified data groups, data regarding curved surface shapes obtained through curve fitting is combined, and reference shape data regarding the object-side surface 3 of the eyeglass lens is extracted (S104). Curve fitting is performed on each of the classified data groups. Specifically, spherical approximation is performed using the method of least squares on the data group regarding the defocus regions 6 and the data group regarding the base region, for example. Accordingly, data regarding a curved surface shape expressing an approximate sphere can be obtained for each defocus region 6 and the base region. Then, data regarding the individual curved surface shapes obtained in this manner is combined to obtain shape data for one surface shape. Accordingly, shape data regarding the shape of the object-side surface 3 of the eyeglass lens from which error components such as roughness and sagging have been removed (i.e., a shape serving as a reference) is extracted as reference shape data.

After reference shape data has been extracted, the degrees of deviation of three-dimensional data from the reference shape data are obtained by comparing the acquired three-dimensional data with the extracted reference shape data as a fifth step (S105). The degree of deviation is composed of difference data from the reference shape data in the Z-coordinate direction for each XY coordinate point of the three-dimensional data. The difference data may be the absolute value of the difference in the Z-coordinate direction as long as it is predetermined, or the absolute value of the difference in the radial direction of a curved surface in consideration of the fact that the base region is a curved surface, for example.

With regard to the surface shape of the object-side surface 3 of the eyeglass lens 1, the degrees of deviation from the reference shape data can be obtained through the above-described steps as the result of evaluation. Also, if the degree of deviation is within a preset allowable range, the surface shape is evaluated as appropriate. On the other hand, if the degree of deviation is not within a preset allowable range, the surface shape is evaluated as inappropriate.

(Details of Cluster Analysis)

Next, a specific procedure for classification of data into data groups utilizing cluster analysis in the third step will be described later in detail.

Figure 6:
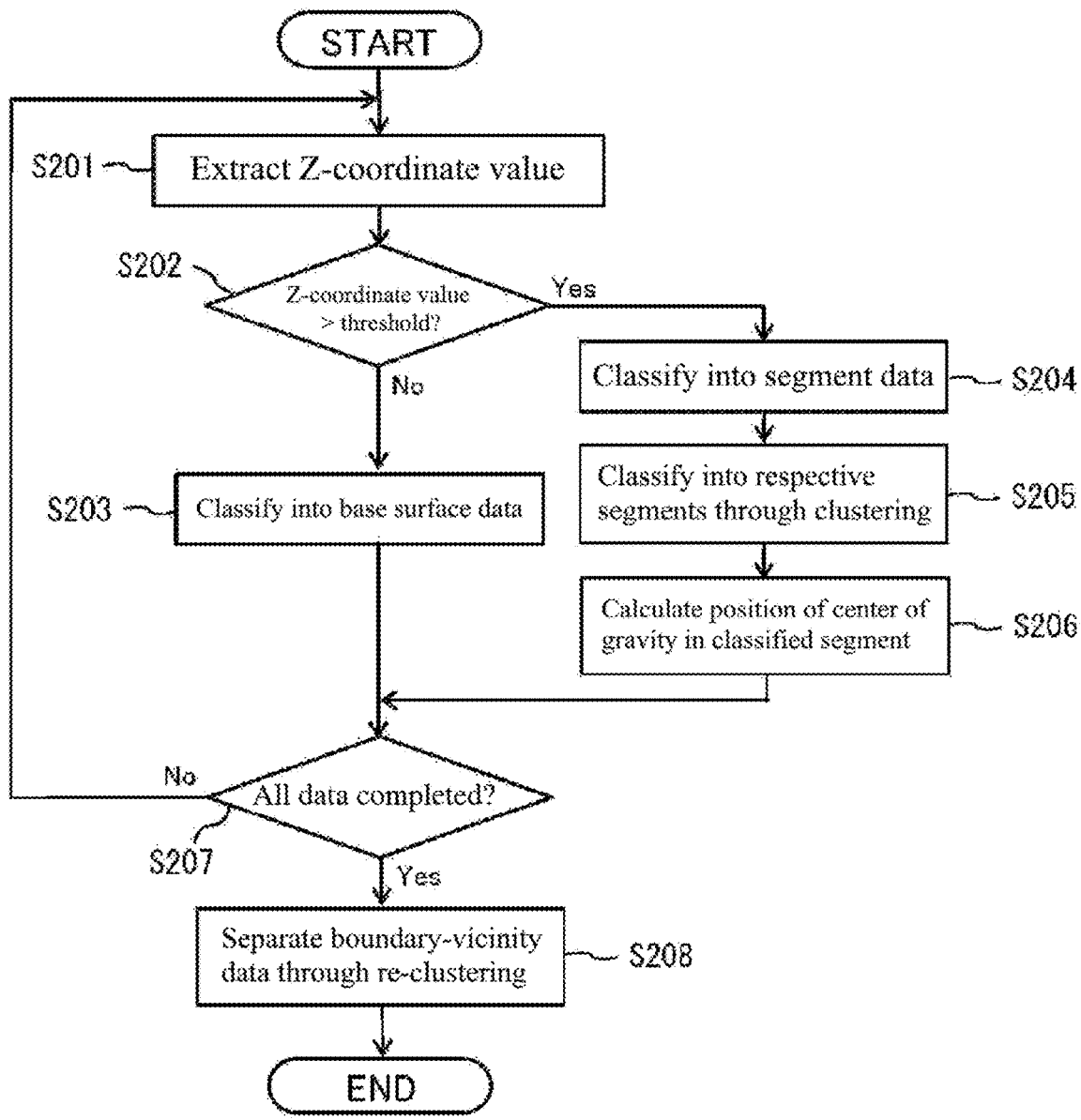
FIG. 6 is a flowchart showing a specific procedure of cluster analysis in the evaluation method shown in FIG. 5.

FIG. 6 is a flowchart showing a specific procedure of cluster analysis.

As shown in FIG. 6, in the third step, given XYZ-coordinate value data is focused on in the acquired three-dimensional data, and the Z-coordinate value is extracted from the XYZ-coordinate value data (S201). When the Z-coordinate value is extracted, a noise component may be removed through smoothing utilizing the Z-coordinate values at the surrounding coordinate points, for example. Also, the range of three-dimensional data from which the Z-coordinate value is to be extracted may be the entire XYZ-coordinate value data included in the three-dimensional data, or may be limited to a specific trimmed range (e.g., a rectangular range in which one side thereof has a predetermined size).

When the Z-coordinate value has been extracted, then, it is determined whether or not the Z-coordinate value is larger than the threshold by comparing the Z-coordinate value with the threshold (height threshold) (S202). As a result, if the Z-coordinate value does not exceed the threshold, the data point is present at a position that does not protrude relatively, and thus the XYZ-coordinate value data thereof is classified as being related to the base surface region, and is associated with an identification flag indicating that the XYZ-coordinate value data belongs to a data group constituting the base surface data (S203). On the other hand, if the Z-coordinate value exceeds the threshold, the data point is present at a position that protrudes relatively, and thus the XYZ-coordinate value data thereof is classified as being related to the defocus regions 6, and is associated with an identification flag indicating that the XYZ-coordinate value data belongs to a data group constituting segment data (S204).

Also, XYZ-coordinate value data belonging to the data group constituting segment data is further classified as to which one of the plurality of defocus regions 6 XYZ-coordinate value data is related to (S205). The data groups regarding the plurality of respective defocus regions (defocus regions are also referred to as "segments" hereinafter) 6 are classified through clustering (grouping) utilizing k-means, for example.

Specifically, pieces of XYZ-coordinate value data associated as segment data are checked one-by-one, and the first XYZ-coordinate value data is registered as a "first cluster" and is classified as XYZ-coordinate value data belonging to the group (data group) thereof. The central coordinate point of the first cluster is the XY-coordinate point of the XYZ-coordinate value data in a situation where one piece of XYZ-coordinate value data belongs to the group. Also, if there is successive XYZ-coordinate value data, the distance between the XY-coordinate point of the XYZ-coordinate value data and the central coordinate point of the already registered cluster is obtained, and the successive piece of coordinate vale data is registered as belonging to a cluster with the shortest distance. However, if the obtained distance is greater than or equal to a predetermined distance value, a new cluster (e.g., a "second cluster") is created, and the obtained distance is registered as belonging to the new cluster.

With the XYZ-coordinate value data associated with segment data through clustering in such a procedure, the positions of the defocus regions 6 need not be clarified in advance, and the XYZ-coordinate value data is classified as to which data group the defocus region 6 is related to.

After completing the classification as to which cluster the data belongs to, for the classified cluster (i.e., the cluster to which XYZ-coordinate value data is added), the position of the center of gravity of the XY-coordinate point in each set of XYZ-coordinate value data belonging to the cluster is calculated (S206). Then, the central coordinate point of the cluster is updated such that the result of calculation of the position of the center of gravity is the central coordinate point. That is, every time XYZ-coordinate value data is classified as to which cluster the XYZ-coordinate value data belongs, the central coordinate point of the cluster to which the XYZ-coordinate value data is added will be updated.

Data classification processing performed according to the above-described procedure is repeatedly performed on XYZ-coordinate value data to be processed (S201 to S207) until completion of the processing of the XYZ-coordinate value data to be processed (S207).

After clustering has been performed on the XYZ-coordinate value data associated as segment data in this manner, data regarding boundary-vicinity regions (referred to as "boundary-vicinity data"), which are transition regions between the defocus regions 6 and the base region, are separated from the respective clusters by performing re-clustering on the clusters (S208).

Specifically, XYZ-coordinate value data within a predetermined distance from the central coordinate point of each cluster (e.g., within a radius of 0.45 mm from the coordinates of the center) is regarded as data belonging to the cluster, and re-clustering is performed such that the other XYZ-coordinate value data is separated from the cluster and is regarded as boundary-vicinity data. This is because, if data is uniformly classified according to the height threshold as described above, the defocus regions 6 and the base region may not be properly classified due to the differences in the degree of waviness of the base region around the defocus regions 6. In contrast, if base surface data and segment data are classified using the threshold, the segment data is grouped into clusters through the above-described clustering, the central coordinate point (e.g., the position of the center of gravity) of each cluster is obtained, and data regarding a region within a predetermined distance from the central coordinate point is regarded as segment data, the defocus regions 6 and the base region can be appropriately and accurately classified.

The three-dimensional data processed in the third step is classified through the above-described processing performed according to the procedure into a data group for segment data regarding the respective defocus regions 6, a data group for the base surface data regarding the base region, and a data group for a boundary-vicinity data regarding boundary-vicinity regions, which are transition regions between the defocus regions 6 and the base region.

(Specific Examples of Data Classification and Reference Shape Data Extraction)

Here, classification of data into the data groups in the third step and extraction of reference shape data in the fourth step will be described using specific examples.

Figure 7:
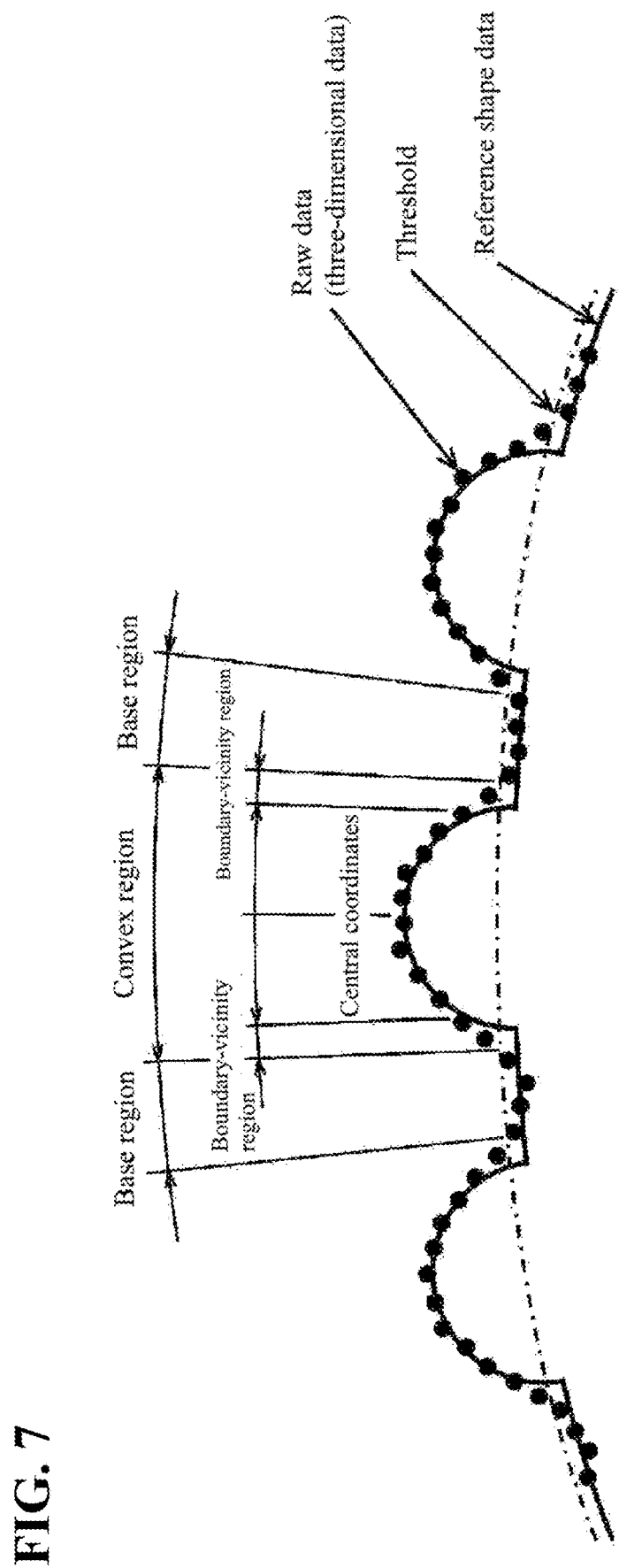
FIG. 7 is a diagram schematically illustrating a specific example of data classification and reference shape data extraction using the evaluation method according to one embodiment of the present disclosure.

FIG. 7 is a diagram schematically illustrating specific examples of data classification and reference shape data extraction.

As shown in FIG. 7, when raw data (three-dimensional data) is acquired, a data group of XYZ-coordinate value data (see black circle marks in FIG. 7) regarding the surface shape of the object-side surface 3 of the eyeglass lens 1 is obtained, and thus a threshold (see dash-dot line in FIG. 7) is derived from the data group, and the XYZ-coordinate value data is classified using the threshold into base surface data (at a height position that does not exceed the threshold) and segment data (at a height position that exceeds the threshold). Then, segment data is classified through clustering as to which defocus region 6 the data is related to (i.e., which cluster it belongs to). Furthermore, data outside the predetermined distance from the central coordinates is separated from the XYZ-coordinate value data belonging to each cluster, as boundary-vicinity data through re-clustering.

Accordingly, the XYZ-coordinate value data constituting raw data (three-dimensional data) is classified into segment data regarding the respective defocus regions 6, base surface data regarding the base region, or boundary-vicinity data regarding boundary-vicinity regions.

After data classification, subsequently, curve fitting is performed on each classified data group. Specifically, with regard to the base surface data, data regarding a curved surface shape expressing an approximate sphere of the base region is obtained by performing curve fitting only on the base surface data. Also, with regard to segment data, data regarding a curved surface shape expressing an approximate sphere of each defocus region 6 is obtained by performing curve fitting individually on the respective clusters (i.e., the respective defocus regions 6). Then, when pieces of data regarding the respective curved surface shapes are obtained individually, the resulting data is combined to obtain shape data regarding one surface shape, and thereby reference shape data (see solid line in FIG. 7) regarding the object-side surface 3 of the eyeglass lens is extracted.

If reference shape data is extracted by performing curve fitting on each classified data group in this manner, even if there is sagging in a boundary-vicinity region in the three-dimensional data, it is possible to eliminate the influence of the sagging on the reference shape data. That is, when reference shape data is extracted, the extraction can be optimized.

(Specific Examples of Degree of Deviation)

Next, the degree of deviation, which is the result of an evaluation obtained using the above-described evaluation method according to the above-described procedure, will be described using a specific example.

Figure 8:
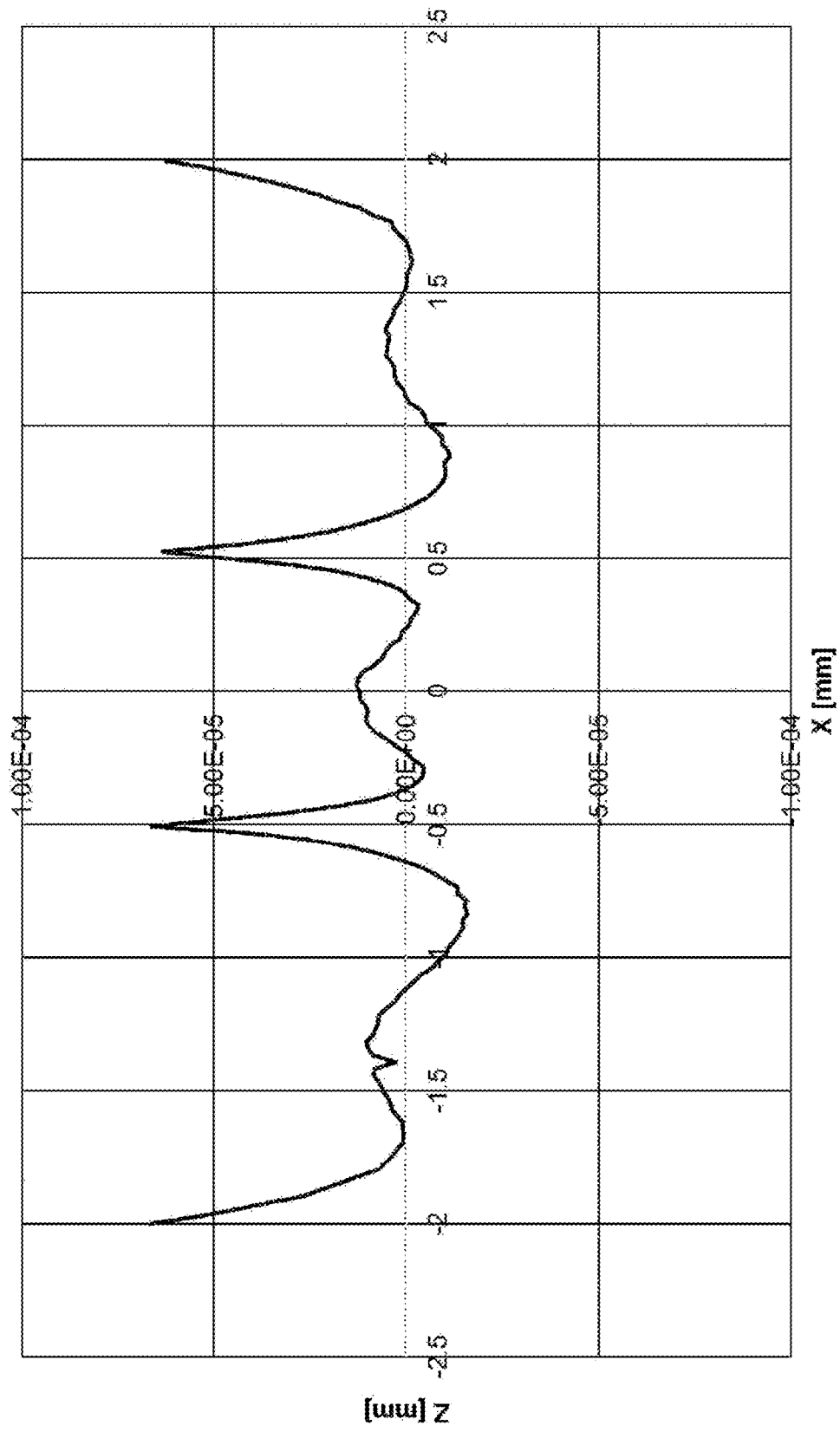
FIG. 8 is an illustrative diagram showing one specific example of the degrees of deviation between a reference shape and a measured shape (actually measured shape), which are obtained using the evaluation method according to one embodiment of the present disclosure, the diagram showing the degrees of deviation regarding a transverse cross-section of the eyeglass lens.
Figure 9:
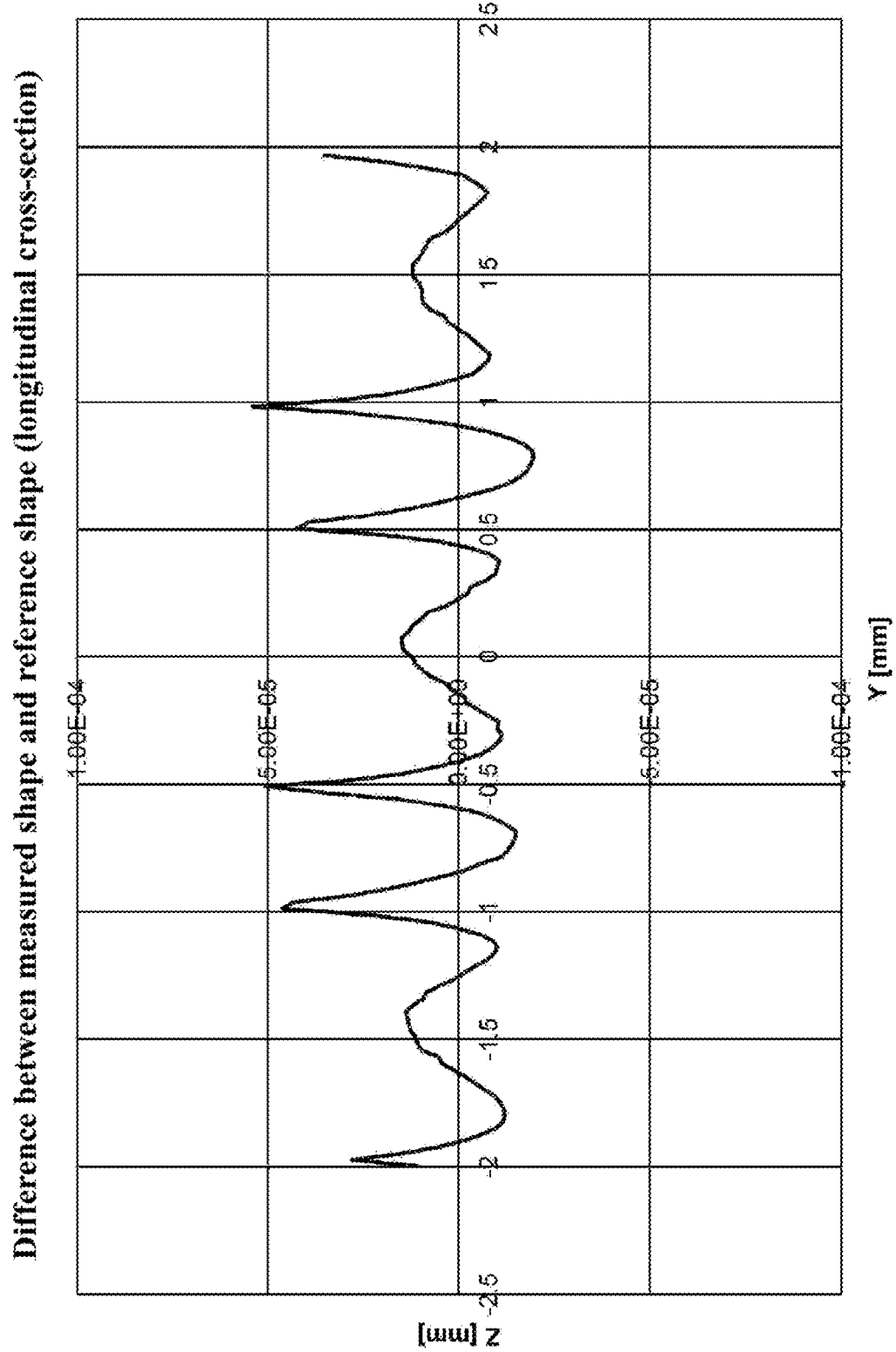
FIG. 9 is an illustrative diagram showing one specific example of the degrees of deviation between a reference shape and a measured shape (actually measured shape), which are obtained using an evaluation method according to one embodiment of the present disclosure, the diagram showing the degrees of deviation regarding a longitudinal cross-section of the eyeglass lens.

FIGS. 8 and 9 are illustrative diagrams showing one specific example of the degrees of deviation between a reference shape and a measured shape (actually measured shape), which are obtained using an evaluation method according to this embodiment. FIG. 8 is a specific example of the degrees of deviation regarding a transverse cross-section of the eyeglass lens 1. Also, FIG. 9 is a specific example of the degrees of deviation regarding a longitudinal cross-section of the eyeglass lens 1.

As described above, the degrees of deviation are composed of difference data between the acquired three-dimensional data and the extracted reference shape data. That is, a difference between the measured shape (actually measured shape) of the object-side surface 3 of the eyeglass lens 1 and the reference shape of the object-side surface 3 is obtained as a degree of deviation. As a result of using such an index called the "degree of deviation", the surface shape of the object-side surface 3 of the eyeglass lens 1 can be evaluated once a curved surface component has been removed. That is, when the shape of the eyeglass lens 1 is evaluated, an invalid component such as a portion where there is sagging can be visualized by removing the curved surface component.

Specifically, as shown in FIG. 8 or 9, as a result of making sagging or the like visible, the degrees of deviation are remarkably high in a portion of the boundary-vicinity regions, and local maxima are present. This is because, when the lens base material 2 is coated with the hard coating film 8 and the antireflection film 10, sagging occurs in a portion of the boundary-vicinity region between a defocus region 6 and a base region.

However, in this embodiment, reference shape data is appropriately extracted through cluster analysis, curve fitting for each data group, or the like. Thus, the boundary between the defocus regions 6 and the base region becomes clear, and even if there is sagging in a portion of the boundary-vicinity region, it is possible to correctly evaluate the surface shape of the object-side surface 3 of the eyeglass lens 1. That is, in this embodiment, the degree of deviation for a portion of the boundary-vicinity region is evaluated correctly and is highly reliable.

A determination is made as to whether or not an obtained degree of deviation is within a preset allowable range, and whether or not the surface shape of the object-side surface 3 of the eyeglass lens 1 is appropriate is determined according to the results of the determination. "Appropriate" here means that the eyeglass lens 1 has desired optical properties, that is, exhibits the effect of suppressing the progression of near-sightedness.

Specifically, it is conceivable to set the allowable range regarding a degree of deviation as follows. If, out of the degrees of deviation, the magnitude of the degree of deviation regarding a boundary-vicinity region (i.e., the magnitude of a local maximum of the degree of deviation) is 15% or less of the protrusion height (protrusion amount) of the defocus region 6, it is determined that the degree of deviation is within the allowable range, for example. If the protrusion height of the defocus region 6 is about 0.1 to 10 µm, or preferably about 0.7 to 0.9 µm, when the magnitude of the degree of deviation is about 0.015 to 1.5 µm, or preferably about 0.105 to 0.135 µm, the magnitude of the degree of deviation is 15% or less of the protrusion height of the defocus region 6, and the degree of deviation is within the allowable range.

More preferably, regardless of the protrusion height of the defocus regions 6, if the magnitude of the degree of deviation is 0.1 µm or less, it is determined that the degree of deviation is within the allowable range.

If the degree of deviation of the boundary-vicinity region is suppressed to 15% or less of the protrusion height of the defocus region 6 or 0.1 µm or less in this manner, it is possible to keep the surface shape of the boundary-vicinity region from adversely affecting the optical properties of the eyeglass lens 1. That is, by appropriately controlling the magnitude of sagging in the boundary-vicinity region so that the degree of deviation falls within the above-described range, desired optical properties can be obtained even with the eyeglass lens 1 in which the object-side surface 3 is coated.

As described above, with regard to the eyeglass lens 1, it is preferable that reference shape data regarding the object-side surface 3 is specified based on the three-dimensional data obtained by measuring the surface shape of the object-side surface 3, the degree of deviation is specified from the reference shape data in the three-dimensional data, and, in order for the eyeglass lens 1 to have desired optical properties and exhibit the effect of suppressing the progression of near-sightedness, the eyeglass lens 1 is configured such that, out of the specified degrees of deviation, the magnitude of the degree of deviation regarding a boundary-vicinity region between a defocus region 6 and a base region is 15% or less of the protrusion height of the defocus region 6.

Also, it is even more preferable that the eyeglass lens 1 is configured such that the magnitude of the degree of deviation regarding the boundary-vicinity region is 0.1 µm or less. This is because, if the magnitude of the degree of deviation is 0.1 µm or less, the eyeglass lens 1 reliably has desired optical properties and exhibits the effect of suppressing the progression of near-sightedness, regardless of the protrusion height of the defocus region 6, and the film thickness of the hard coating film 8 or the antireflection film 10.

(3) Method for Manufacturing Eyeglass Lens

Next, a method for manufacturing the eyeglass lens 1 having the above-described configuration will be described.

When the eyeglass lens 1 is manufactured, first, the lens base material 2 is formed using a known forming method such as cast polymerization. The lens base material 2 having the defocus regions 6 on at least one surface thereof can be obtained through molding using cast polymerization, using a mold having a molding surface provided with a plurality of recesses, for example.

Then, after the lens base material 2 has been obtained, the hard coating film 8 is then formed on the surface of the lens base material 2. The hard coating film 8 can be formed using a method of immersing the lens base material 2 in a hard coating liquid, through spin coating, or the like.

After the hard coating film 8 has been formed, the antireflection film 10 is then formed on the surface of the hard coating film 8. The hard coating film 8 can be formed by forming a film of an antireflection agent through vapor deposition.

The eyeglass lens 1 having the object-side surface 3 provided with a plurality of defocus regions 6 that protrude toward the object side can be obtained using a manufacturing method according to such a procedure.

Incidentally, the manufacturing method in this embodiment includes the above-described curved surface shape evaluation method according to the above-described procedure. That is, the degrees of deviation are obtained through the above-described first to fifth steps. Then, the eyeglass lens 1 is manufactured by reflecting the results of obtaining the degrees of deviation.

Specifically, after a test lens that is to serve as a sample is produced, the degrees of deviation of the test lens are obtained, and if a degree of deviation is out of the allowable range, the conditions under which the hard coating film 8 or the antireflection film 10 is formed are changed, and the test lens is produced again, for example. If the degree of deviation is within the allowable range, the eyeglass lens 1, which is to be of a product version, is produced under the same conditions as the test lens. The eyeglass lens 1 having a degree of deviation in the allowable range can be produced by reflecting the results of obtaining the degrees of deviation.

Note that, although an example is described here in which the degrees of deviation are reflected using the test lens, there is no limitation thereto. If modification processing can be performed on the object-side surface 3 and a degree of deviation is out of the allowable range, the degree of deviation may be reflected by performing modification processing such that the degree of deviation falls within the allowable range, for example.

(4) Effects of this Embodiment

According to this embodiment, one or more effects described below can be obtained.

(a) Because reference shape data is extracted based on three-dimensional data, which is a result of measurement of a surface shape, and the degrees of deviation of the three-dimensional data from the reference shape data are obtained, even if the surface shape constituted by a combination of different curved surfaces is evaluated, design data regarding the surface shape is not required. That is, the surface shape can be evaluated without depending on design data, and thus, even if the eyeglass lens 1 is obtained by coating the object-side surface 3 with a film, the surface shape can be correctly evaluated.

Because reference shape data is extracted by performing curve fitting on each data group classified utilizing cluster analysis, reference shape data can be specified without requiring design data, or matching with the design data. Also, even if sagging is included in the measured three-dimensional data, the influence of the sagging on the reference shape data can be eliminated. Also, it is possible to clearly specify boundary portions between the defocus regions 6 and the base region from the results of classification utilizing cluster analysis. Thus, this is very favorable, in particular for correctly evaluating boundary-vicinity regions between the defocus regions 6 and the base region.

Because sagging does not influence reference shape data, the magnitude of sagging included in the three-dimensional data can be correctly evaluated by obtaining the degrees of deviation between the three-dimensional data and reference shape data.

As a result of using an index called the "degree of deviation", the surface shape of the object-side surface 3 of the eyeglass lens 1 can be evaluated after a curved surface component has been removed. That is, when the shape of the eyeglass lens 1 is evaluated, an invalid component such as a portion where there is sagging can be visualized by removing the curved surface component.

As described above, in this embodiment, it is possible to correctly evaluate the surface shape of the eyeglass lens 1 having the defocus regions 6, and as a result, to appropriately control the magnitude of sagging. Therefore, according to this embodiment, it is possible to make the eyeglass lens 1 sufficiently exhibit the effect of suppressing the progression of near-sightedness through appropriate evaluation of the surface shape.

(b) In this embodiment, a data group regarding the defocus regions 6 and a data group regarding the base region are classified based on a threshold derived from three-dimensional data. As a result of deriving the threshold for classifying the data groups from three-dimensional data (i.e., the results of measurement), the threshold conforms to the actual surface to be evaluated, and, as a result, evaluation of the surface shape performed through classification of data into data groups can be optimized. Even if the eyeglass lens 1 to be measured is installed in an inclined state, for example, the influence of the inclination can be eliminated.

(c) In this embodiment, three-dimensional data is approximated using the method of least squares, and a value determined utilizing a bearing curve regarding the result of the approximation is used as a threshold. As a result of determining the threshold utilizing a bearing curve in this manner, the threshold is very suited to application to the analysis of the surface shape of the eyeglass lens 1 having the plurality of defocus regions 6 on the object-side surface 3.

(d) In this embodiment, data groups regarding the plurality of respective defocus regions 6 are classified utilizing k-means. Performing data classification through clustering utilizing k-means in this manner is very suitable, in particular, for application to the analysis of the surface shape of the eyeglass lens 1 in which multiple defocus regions 6 are arranged side-by-side on the object-side surface 3.

(e) In this embodiment, in the step of classifying three-dimensional data into data groups, the three-dimensional data is classified into a data group regarding the defocus regions 6, a data group regarding the base region, and a data group regarding boundary-vicinity regions. If the data group regarding the boundary-vicinity regions is also classified in this manner, the ranges of the boundary-vicinity regions become clear, and thus such classification is very suitable for correctly evaluating sagging in the boundary-vicinity regions.

(f) In this embodiment, when the eyeglass lens 1 is manufactured, the results of obtaining the degrees of deviation are reflected. The eyeglass lens 1 having a degree of deviation in the allowable range can be reliably obtained by reflecting the results of obtaining the degrees of deviation.

(g) In this embodiment, with regard to the eyeglass lens 1, the magnitude of the degree of deviation regarding the boundary-vicinity regions between the defocus regions 6 and the base region is 15% or less, and preferably 0.1 μm or less of the protrusion height of the defocus regions 6. If the degree of deviation of the boundary-vicinity regions is suppressed to 15% or less of the protrusion height of the defocus regions 6 or 0.1 μm or less in this manner, it is possible to keep the surface shape of the boundary-vicinity regions from adversely affecting the optical properties of the eyeglass lens 1. That is, by appropriately controlling the magnitude of sagging in the boundary-vicinity region so that the degree of deviation falls within the above-described range, desired optical properties can be obtained even with the eyeglass lens 1 in which the object-side surface 3 is coated.

This can be realized by using the index called the "degree of deviation", that is, by removing a curved surface component from the surface shape of the object-side surface 3 of the eyeglass lens 1 to visualize an invalid component such as a portion where there is sagging.

(5) Variations and the Like

Although embodiments of the present disclosure were described above, the disclosed content described above indicates exemplary embodiments of the present disclosure. That is to say, the technical scope of the present disclosure is not limited to the above-described exemplary embodiments, and various modifications can be made without departing from the gist thereof.

Although the eyeglass lens whose surface is coated with a film was described as an example in the above-described embodiment, for example, the evaluation method according to the present disclosure and the allowable range of the degree of deviation obtained using the evaluation method are applicable regardless of the presence or absence of the coating film (i.e., even with an eyeglass lens that is not coated with a film).

In the above-described embodiment, the case where the object-side surface has defocus regions, and the defocus regions protruding toward the object side was described as an example. On the other hand, even if the eyeball-side surface has defocus regions and the defocus regions protrude toward the eyeball side, the base region and the defocus regions are still present, and the evaluation procedure does not change, and the technical idea of the present disclosure is applicable. Also, this variation and this embodiment may be combined, and both surfaces may have defocus regions.

The previously described technical idea of the eyeglass lens 1 in one aspect of the present disclosure is applicable to the eyeglass lens 1 that functions to suppress the progression of far-sightedness. More specifically, the defocus regions 6 are configured to function to cause luminous flux to converge at a position B' (i.e., on the back side relative to the position A) located farther from the object than the position A is on the retina in the direction in which light travels. Also, if the lens base material 2 functions to suppress the progression of far-sightedness, "convex" of the base material convex portion 2a is changed to "concave". By changing "convex" to "concave", "protrusion" to "recess", and the "protrusion height" to the "recess depth" in the above-described eyeglass lens 1 of one aspect of the present disclosure, and changing a description such that luminous flux converges at the position B' that is located farther away from the object than the position A on the retina is, the eyeglass lens 1 exhibiting the function of suppressing the progression of far-sightedness can be obtained.

LIST OF REFERENCE NUMERALS

1 Eyeglass lens
2 Lens base material
3 Object-side surface
4 Eyeball-side surface
6 Defocus region
6a, 6b Convex region
8 Hard coating film
10 Antireflection film
20 Eyeball
20A Retina

The invention claimed is:

1. A method of evaluating a curved surface shape of an eyeglass lens, the eyeglass lens having a surface that has a plurality of defocus regions, the surface being at least one of an object-side surface of the eyeglass lens and an eyeball-side surface of the eyeglass lens, the method comprising:
    acquiring three-dimensional data that describes a shape of the surface of the eyeglass lens that has the plurality of defocus regions;
    classifying the three-dimensional data, using cluster analysis, into a plurality of data groups;
    performing curve fitting on each of the plurality of data groups to obtain curved surface shape data;

combining the curved surface shape data and extracting reference shape data that approximates the shape of the surface of the eyeglass lens that has the plurality of defocus regions; and comparing the three-dimensional data and the reference shape data and obtaining degrees of deviation of the three-dimensional data from the reference shape data, wherein the plurality of data groups includes, for each of the plurality of defocus regions, a respective data group, and wherein the plurality of data groups also includes, for a base region of the surface of the eyeglass lens that has the plurality of defocus regions, a corresponding data group, the base region being a region in which the plurality of defocus regions are not formed.

2. The method according to claim 1, wherein the classifying the three-dimensional data into the plurality of data groups includes using a threshold derived from the three-dimensional data.

3. The method according to claim 2, wherein the method comprises deriving the threshold from the three-dimensional data, the deriving comprising:
using a least-squares method to approximate a surface shape from the three-dimensional data; and
obtaining the threshold from a bearing curve that describes a relation between the three-dimensional data and the approximated surface shape.

4. The method according to claim 1, wherein the classifying the three-dimensional data into the plurality of data groups includes performing k-means clustering to obtain the data groups corresponding to the plurality of respective defocus regions.

5. The method according to claim 1, wherein the plurality of data groups comprises a data group corresponding to a boundary-vicinity region, the boundary-vicinity region being a transition region between the defocus regions and the base region.

6. A method for manufacturing an eyeglass lens, comprising:
acquiring three-dimensional data that describes a shape of the surface of the eyeglass lens that has the plurality of defocus regions, the surface being at least one of an object-side surface of the eyeglass lens and an eyeball-side surface of the eyeglass lens;
classifying the three-dimensional data, using cluster analysis, into a plurality of data groups;
performing curve fitting on each of the plurality of data groups to obtain curved surface shape data;
combining the curved surface shape data and extracting reference shape data that approximates the shape of the surface of the eyeglass lens that has the plurality of defocus regions; and
comparing the three-dimensional data and the reference shape data and obtaining degrees of deviation of the three-dimensional data from the reference shape data,
wherein the plurality of data groups includes, for each of the plurality of defocus regions, a respective data group, and
wherein the plurality of data groups also includes, for a base region of the surface of the eyeglass lens that has the plurality of defocus regions, a corresponding data group, the base region being a region in which the plurality of defocus regions are not formed.

7. The method for manufacturing an eyeglass lens according to claim 6, wherein at least one condition for a film coating is modified based on the degrees of deviation.

8. An eyeglass lens having a surface that has a plurality of defocus regions, the surface being at least one of an object-side surface of the eyeglass lens and an eyeball-side surface of the eyeglass lens, the eyeglass lens manufactured by a process comprising:
acquiring three-dimensional data that describes a shape of the surface of the eyeglass lens that has the plurality of defocus regions, the surface being at least one of an object-side surface of the eyeglass lens and an eyeball-side surface of the eyeglass lens;
classifying the three-dimensional data, using cluster analysis, into a plurality of data groups;
performing curve fitting on each of the plurality of data groups to obtain curved surface shape data;
combining the curved surface shape data and extracting reference shape data that approximates the shape of the surface of the eyeglass lens that has the plurality of defocus regions; and
comparing the three-dimensional data and the reference shape data and obtaining degrees of deviation of the three-dimensional data from the reference shape data,
wherein the plurality of data groups includes, for each of the plurality of defocus regions, a respective data group, and
wherein the plurality of data groups also includes, for a base region of the surface of the eyeglass lens that has the plurality of defocus regions, a corresponding data group, the base region being a region in which the plurality of defocus regions are not formed;
wherein the surface includes:
a base region, which is a region where the defocus regions are not formed; and
a boundary-vicinity region, which is a transition region between the defocus regions and the base region, and
wherein a magnitude of a degree of deviation of the boundary-vicinity region from a reference shape is not more than fifteen percent of a protrusion height or a recess depth of the defocus regions.

9. The eyeglass lens according to claim 8, wherein the magnitude of the degree of deviation is 0.1 μm or less.

10. The eyeglass lens according to claim 8, wherein the reference shape comprises:
an approximation of a surface of the base region; and
for each of the defocus regions, an approximation of a surface of the defocus region.

11. The eyeglass lens according to claim 10, wherein the approximation of the surface of the base region is a spherical approximation of the surface of the base region, and
wherein, for each of the defocus regions, the approximation of the surface of the defocus region is a spherical approximation of the surface of the defocus region.

* * * * *